United States Patent Office 3,035,917
Patented May 22, 1962

3,035,917
DIRECT POSITIVE EMULSIONS
Douglas James Fry and Bernard Alan Lea, Ilford, England, assignors to Ilford Limited, Ilford, England, a company of Great Britain
No Drawing. Filed Nov. 4, 1959, Ser. No. 850,752
Claims priority, application Great Britain Nov. 12, 1958
5 Claims. (Cl. 96—101)

This invention relates to the production of direct positive emulsions.

There has already been described a method of producing a direct positive emulsion in which there is incorporated in a silver chloride emulsion, which is substantially free from silver bromide or silver iodide, a proportion of a disensitising compound and the emulsion is fogged by light or chemical means. When an emulsion so produced is thereafter exposed and developed, a positive image is directly produced.

In fact, however, suitable desensitising compounds for the aforesaid process are quite rare. Compounds selected from benzthiazole, quinoline, indolenine, benztriazole and rhodanine compounds, and their alkyl quaternary salts, having a nitro group attached to a benzene nucleus, have been proposed, as have also compounds such as 4-(m-nitrostyryl) cinnoline methyl p-toluene sulphonate and 4-(m-nitrostyryl) quinazoline methyl p-toluene sulphonate.

Other suitable compounds are disclosed in application Ser. No. 763,785, filed September 29, 1958.

According to the present invention there is provided a direct positive photographic material which comprises a silver chloride emulsion which has been fogged by light or by chemical means and which includes a desensitising compound of the general formula:

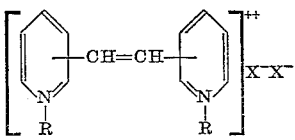

where R represents an alkyl or aralkyl group, X is an acid radical, and the dimethine bridge links the pyridinium rings in 2:2'-, 2:3'-, 2:4'-, 3:4'- or 4:4'-position.

R is preferably an aralkyl group, but where it is a lower alkyl group it is preferred that it should contain up to 4 carbon atoms. X may be any acid radical, e.g., a halide (chloride, bromide or iodide), sulphate or p-toluene sulphonate radical.

The aforesaid compounds may be prepared by heating the corresponding bases (i.e. the compounds in which R and X are not present) with at least two molecular equivalents of an alkyl or aralkyl salt RX, e.g. an alkyl halide, sulphate or p-toluene sulphonate. Preferably the quaternising reagent is employed in substantial excess, e.g. 4 or more molecular equivalents.

The following are examples of the production of the said compounds for use in the present invention:

EXAMPLE 1

1:2-Di(2-Pyridyl) Ethylene Bis Metho-Toluene-p-Sulphonate

1:2-di(2-pyridyl) ethylene (0.91 g.) and methyl toluene-p-sulphonate (5 g.) were mixed and heated in an oil bath at 130° C. for 1½ hours. After cooling the material was boiled with benzene (50 ml.), filtered hot and the process repeated twice more, once with benzene and finally with dry acetone. The product (2.7 g.) had M.Pt. 277° C.

EXAMPLE 2

1:2-Di(2-Pyridyl) Ethylene Bis Etho-Toluene-p-Sulphonate

1:2-di(2-pyridyl) ethylene (0.91 g.) and ethyl toluene-p-sulphonate (6.0 g.) were mixed and heated in an oil bath at 130° C. for 4½ hours. After cooling the material was purified as in Example 1. The product (3.0) had M.Pt. 220° C.

EXAMPLE 3

1(2-Pyridyl)-2-(4-Pyridyl) Ethylene Bis Etho-Toluene-p-Sulphonate

1(2-pyridyl)-2-(4-pyridyl) ethylene (0.91 g.) and ethyl toluene-p-sulphonate (2.3 g.) were mixed and heated in an oil bath at 120° C. for 7 hours. After cooling the material was boiled with benzene (20 ml.) and filtered hot to leave the product (2.9 g.) with M.Pt. 184–186° C.

EXAMPLE 4

1(2-Pyridyl)2-(4-Pyridyl) Ethylene Bis Benzobromide

To 1(2-pyridyl)-2-(4-pyridyl) ethylene (1.82 g.) in chloroform (25 ml.) was added benzyl bromide (4 ml.) and the mixture heated at 80° C. for 72 hours. The product separated during the heating period and was collected by filtering the hot mixture. This product, after washing with chloroform and drying in a vacuum desiccator, was obtained as pale yellow crystals (5.3 g.), M.Pt. 220–225° C.

EXAMPLE 5

1:2-Di(4-Pyridyl) Ethylene Bis Etho-Toluene-p-Sulphonate

1:2-di(4-pyridyl) ethylene (0.91 g.) and ethyl toluene-p-sulphonate (2.3 g.) were mixed and heated in an oil bath at 120° C. for 7 hours. After cooling the material was boiled with benzene (50 ml.) and filtered hot. The product (2.9 g.) had M.Pt. 174–178° C.

EXAMPLE 6

1:2-Di(4-Pyridyl) Ethylene Bis Benzochloride

1:2-di(4-pyridyl) ethylene (0.91 g.) and benzyl chloride (3 ml.) were mixed and heated in an oil bath at 130° C. for 4 hours. After cooling the mixture was diluted with dry ether and filtered. The residue was boiled with dry acetone (30 ml.) and filtered hot to leave the product (1.6 g.) with M.Pt. 285° C.

EXAMPLE 7

1(3-Pyridyl)-2(4-Pyridyl) Ethylene Bis Benzochloride

1(3-pyridyl)-2(4-pyridyl) ethylene (0.91 g.) and benzyl chloride (3 ml.) were mixed and heated in an oil bath at 130° C. for 3 hours. The solid formed was ground with dry ether and filtered off. The yield was quantitative, the material having M.Pt. 221° C. (d.).

EXAMPLE 8

1(3-Pyridyl)-2(4-Pyridyl) Ethylene Bis Etho Toluene-p-Sulphonate

1(3-pyridyl)-2(4-pyridyl) ethylene (0.91 g.) and ethyl toluene-p-sulphonate (2.3 g.) were mixed and heated in an oil bath at 120° C. for 7 hours. After cooling the material was boiled with benzene (50 ml.), filtered hot and the process repeated. The product (2.7 g.) had M.Pt. 150–154° C.

EXAMPLE 9

1(2-Pyridyl)-2(3-Pyridyl) Ethylene Bis Benzochloride

1(2-pyridyl)-2(3-pyridyl) ethylene (0.91 g.) and benzyl chloride (10 ml.) were mixed and heated in an oil bath at 130° C. for 4 hours. After cooling the material was boiled with benzene (50 ml.), filtered hot and the process repeated. The product (2.3 g.) had M.Pt. 220° C.

EXAMPLE 10

1:2-Di(2-Pyridyl) Ethylene-Bis-Benzobromide

1:2-di(2-pyridyl) ethylene (0.46 g.) and benzyl bromide (1 ml.) were heated together at 115° for 2 hours. The solid product was ground with dry benzene and filtered to give a pale yellow solid (1.32 g.), M.Pt. 244–245° C.

In the production of direct positive emulsions according to the invention, the selected compound of the type defined is included in the silver chloride emulsion in an amount which is preferably from 0.1 to 2 gm. of the compound per 100 gms. of silver chloride. The emulsion may be pre-fogged by exposure to light, but it is preferred to pre-fog the emulsion chemically, for example by including formaldehyde in the emulsion and allowing the emulsion to stand at elevated temperature. It is generally advantageous to include an optical bleaching agent, known per se, in the emulsion or in the support on which the emulsion is coated.

The following example will serve to illustrate the production of direct positive emulsions according to the invention:

EXAMPLE 11

4.4 litres of a washed photographic emulsion containing 188 g. silver chloride and adjusted to a pH of 10 were treated with 12 ml. of a 4% solution of formaldehyde. After heating for 35 minutes at 125° F., the emulsion was neutralised by addition of citric acid and cooled. There was then added 2 g. of a compound as defined in any of the foregoing Examples 1 to 10 above dissolved in 100 ml. of water and 120 ml. of a 5% aqueous solution of Tinopal 2 BP (a commercial optical bleaching agent). The emulsion was coated on paper.

On exposure and development the coated paper yielded a direct positive image of high quality.

The desensitising compounds of this invention present an important advantage over the desensitisers hitherto proposed for the same purpose. It has been a disadvantage of direct positive materials as hitherto produced that, while they afford good positive reproduction following exposure to the bright light of the exposure device, they have tended to suffer image loss in ordinary room illumination before processing. The direct positive materials of the present invention have been found to afford equally good direct positive reproduction, but to be less affected by the relatively low level of ordinary room illumination between exposure and processing.

What we claim is:

1. A direct positive photographic element comprising a fogged gelatino silver chloride emulsion containing a desensitising compound of the general formula:

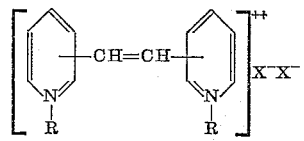

where R represents a group selected from the class consisting of alkyl and aralkyl groups, X is an anion, and the dimethine bridge links the pyridinium rings in a position selected from the 2:2′-, 2:3′-, 2:4′-, 3:4′- and 4:4′-positions.

2. A direct positive photographic element according to claim 1 wherein the emulsion is chemically fogged.

3. A direct positive photographic element according to claim 1 wherein the emulsion is fogged by treatment with formaldehyde.

4. A direct positive photographic element according to claim 1 wherein the emulsion is fogged by light.

5. A direct positive photographic element according to claim 1 wherein the proportion of desensitising compound is 0.1 to 2 g. per 100 g. of silver chloride.

References Cited in the file of this patent

UNITED STATES PATENTS

| | | |
|---|---|---|
| 1,623,499 | Sheppard et al. | Apr. 5, 1927 |
| 2,265,907 | Kendall | Dec. 9, 1941 |